(12) United States Patent
McMurtry et al.

(10) Patent No.: US 7,124,514 B2
(45) Date of Patent: Oct. 24, 2006

(54) PROBE FOR HIGH SPEED SCANNING

(75) Inventors: David Roberts McMurtry, Gloucestershire (GB); Geoffrey McFarland, Gloucestershire (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/534,356

(22) PCT Filed: Dec. 5, 2003

(86) PCT No.: PCT/GB03/05317

§ 371 (c)(1),
(2), (4) Date: May 9, 2005

(87) PCT Pub. No.: WO2004/051181

PCT Pub. Date: Jun. 17, 2004

(65) Prior Publication Data

US 2005/0283990 A1    Dec. 29, 2005

(30) Foreign Application Priority Data

Dec. 5, 2002    (GB) ................................. 0228368.7

(51) Int. Cl.
*G01B 7/28* (2006.01)
(52) U.S. Cl. .......................................... 33/556; 33/559
(58) Field of Classification Search ................ 33/556
See application file for complete search history.

(56) References Cited

U.S. PATENT DOCUMENTS

| | | | |
|---|---|---|---|
| 3,869,799 A | 3/1975 | Neuer et al. | |
| 4,397,188 A * | 8/1983 | Bansevichus et al. | ......... 33/561 |
| 4,530,159 A | 7/1985 | Ernst | |
| 5,040,306 A | 8/1991 | McMurtry et al. | |
| 5,048,194 A * | 9/1991 | McMurtry | ................ 33/558 |
| 5,339,535 A * | 8/1994 | McMurtry et al. | ............ 33/558 |
| 5,390,424 A | 2/1995 | Butter et al. | |

FOREIGN PATENT DOCUMENTS

| | | |
|---|---|---|
| EP | 0 869 328 A2 | 10/1998 |
| WO | WO 90/07097 | 6/1990 |
| WO | WO 00/60310 | 10/2000 |

* cited by examiner

*Primary Examiner*—Christopher W. Fulton
(74) *Attorney, Agent, or Firm*—Oliff & Berridge, PLC

(57) ABSTRACT

A measurement probe (5) which comprises a housing (16) for mounting on an arm (6) of a coordinate positioning apparatus (2) and a stylus (10) mounted on a stylus support member (28). The stylus (10) and the stylus support member (28) are deflectable with respect to the housing (16). A first transducer system (40–48) measures movement of the stylus support member (28) relative to the arm (6) of the coordinate positioning apparatus (2). A second transducer system (38) measures movement of the stylus tip (12) relative to the stylus supporting member (28). A measurement of total stylus deflection is achieved by combining data from the first and second transducer systems.

18 Claims, 6 Drawing Sheets

PROBE FOR HIGH SPEED SCANNING

This invention relates to a scanning probe for use on a coordinate positioning machine such as a coordinate measuring machine, machine tool, manual coordinate measuring arm or inspection robot, to measure the position or contour of a surface.

One known type of coordinate positioning machines includes for example an arm supported for movement in mutually perpendicular directions relative to a table on which a workpiece is supportable, and transducers for measuring the position of the arm relative to a reference position or datum on the table. A scanning probe typically comprises a relatively fixed structure such as a housing, a stylus supported on a support assembly for 3-dimensional movement relative to the fixed structure, and transducers for measuring the position of the stylus relative to a reference position on the fixed structure.

In use the fixed structure of the probe is secured to the arm of the machine and, in a typical operation, the stylus engages a point on the workpiece where, as a result, it is displaced relative to the fixed structure. The sum of the outputs of the respective transducers in the probe and coordinate positioning machine defines the position of the stylus relative to the datum.

A conventional type of scanning probe consists of a parallel spring mechanism which allows the stylus to translate, a deflection measurement system to measure the stylus translation, and damping means to minimise free space inertia deflection of the probe mechanism and stylus.

It is known from U.S. Pat. No. 5,390,424 to provide an analogue probe having a stylus supported relative to a fixed structure by three serially connected parallel springs. Displacement of the stylus relative to the fixed structure is transduced by optical means, comprising three optical scales provided on a member to which the stylus is connected and corresponding readheads located on the fixed structure adjacent the optical scales. The member moves relative to the fixed structure with movements which correspond to the movements of the sensing tip of the stylus.

In such a probe, movement of the member to which the stylus is connected is generally measured in three or more dimensions.

This is an example of a passive probe, in which during measurement the springs in the suspended probe mechanism generate a force to match the deflection. This contact force varies with deflection but is highly repeatable.

U.S. Pat. No. 3,869,799 discloses a probe with a stylus supported by a series of spring parallelograms and in which motors are provided to generate a predetermined force between the stylus tip and the workpiece to be measured.

This probe is a type of active scanning probe which uses a motorised mechanism to control stylus deflection and modulate the contact force with the component to be measured. In such a probe, motors, rather than springs, generate the contact force.

These types of probes generally allow a measuring range of several millimeters and thus have a low corresponding measuring bandwidth.

International Patent Application No. WO00/60310 describes a probe which includes a hollow stylus wherein an optical transducer system is provided within the stylus assembly. A light source directs a light beam towards a retroreflector in the stylus tip which is reflected towards a detector, such that lateral displacement of the stylus tip can be measured.

It is desired to inspect workpieces at a fast speed using high speed scanning. However high speed scanning results in a significant increase in the vibration of the total system.

In addition, at high speed the stylus tip may no longer follow the surface contours of the workpiece and instead just remain in contact with the surface at the peaks of the contours, whilst losing contact with the surface at the troughs. It is desirable for the probe to have sufficient mechanical response to follow the surface contours of the workpiece at high speed. The mechanical response is the ability of the probe mechanism (for example the springs) to track the surface.

If the mechanical response of the scanning probe is low, for example less than 20 Hz, the probe will not be able to react to the vibrations and contour modulations described above and a mismatch or error can occur between the combined coordinate measuring machine and scanning probe data and the actual surface profile.

It is also common for the probe to have mechanical or electrical vibration damping to damp any unwanted transient vibrations or inertia during movement of the probe and machine arm. However, during fast scanning, this damping has the unwanted effect of masking some surface induced stylus bending and thus causing a measuring error.

To ensure adequate data matching with the surface, a transducer having a high mechanical response bandwidth for measuring either stylus deflection or force is required. However a transducer with a high mechanical response bandwidth and high natural frequency will have a limited working range. For example, a transducer with a frequency response of over 50 Hz may have a working range of less than 500 µm.

The present invention provides a probe for use on a coordinate positioning apparatus comprising:
- a housing attachable to an arm of the coordinate positioning apparatus and a stylus mounted on a stylus support member, said stylus and stylus support member being deflectable with respect to the housing;
- a first transducer system which measures movement of the stylus support member relative to the arm of the coordinate positioning apparatus;
- a second transducer system which measures movement of the tip of the stylus relative to the stylus supporting member;
- a tip position calculator which combines outputs from the first and second transducer systems to provide a measurement of total stylus deflection.

The first transducer system may measure movement of the stylus support member relative to the arm of the coordinate positioning apparatus in at least three dimensions. Preferably the first transducer system measures linear motion. The first transducer system may measure transverse movement of the stylus support member relative to the arm of the coordinate positioning apparatus. The first transducer system may have a range of less than 5 mm.

Preferably the second transducer system has a higher mechanical response than the first transducer system.

Preferably the second transducer system has a mechanical response exceeding 100 Hz.

The first transducer system controls the working range and the second transducer system controls the surface response. A second transducer system having a mechanical response of at least 5 times the mechanical response of the first transducer system produces the optimal effect of good surface response over a sufficiently large working range.

The combination of the data from the first and second transducers enables the probe to scan a surface at high speed whilst remaining in full contact with the surface contours and retaining an acceptable working range.

The second transducer system may measure movement of the tip of the stylus relative to the stylus supporting member in two dimensions.

The second transducer system may comprise for example strain gauges, capacitance sensing or optical sensing.

Preferably the second transducer system is located near the tip of the stylus.

The probe may be a passive or active probe.

According to a second aspect, the invention provides a probe for use on a coordinate positioning apparatus comprising:
 a housing attachable to an arm of the coordinate positioning apparatus and a stylus deflectable with respect to the housing;
 a first transducer system which measures movement of the stylus relative to the arm of the coordinate positioning apparatus;
 a second transducer system which measures movement of the tip of the stylus relative to the first transducer system;
 a tip position calculator which combines outputs from the first and second transducer systems to provide a measurement of total stylus deflection.

According to a third aspect, the invention provides a method of measuring a surface of an object with a probe, said probe comprising a housing and a stylus mounted on a stylus support member, said stylus and stylus support member being deflectable with respect to the housing; the method comprising the steps of:
 mounting the probe on an arm of a coordinate positioning apparatus;
 positioning the probe so that the stylus is in contact with the surface to be measured and moving the probe along said surface with the stylus remaining in contact with said surface;
 obtaining data from a first transducer system which measures movement of the stylus supporting member relative to the arm of the coordinate positioning apparatus;
 obtaining data from a second transducer system which measures movement of the tip of the stylus relative to the stylus supporting member;
 and combining the data from the first and second transducer systems to produce a measurement of total probe deflection.

Data from the first and second transducer systems may be combined by combining the outputs of the first and second transducer systems at a tip position calculator.

Embodiments of the invention will now be described by way of example, and with reference to the accompanying drawing wherein.

Figure 1:
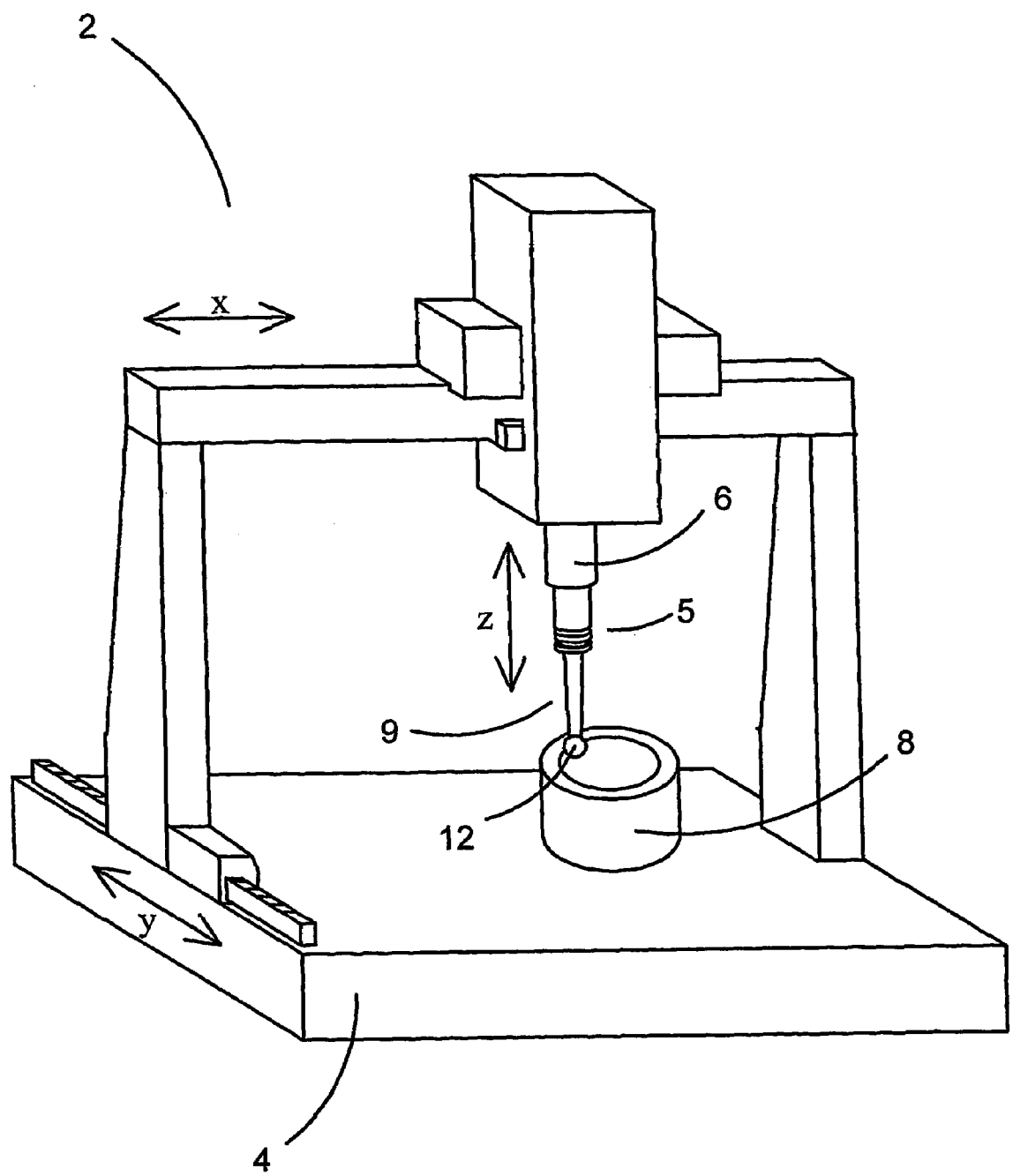
FIG. 1 illustrates an analogue probe mounted on a coordinate measuring machine.

A coordinate measuring machine (CMM) 2 is shown in FIG. 1 and comprises a machine table 4 on which a workpiece 8 may be placed. An analogue probe 5 having a deflectable stylus 9 and workpiece-contacting tip 12 is mounted on a quill 6 of the machine 4. The quill 6 and probe 5 may move in X, Y and Z directions under the action of the CMM X, Y and Z drives controlled by a computer. X, Y and Z scales of the CMM show the instantaneous coordinates of the position of the quill on which the probe is mounted in three dimensions. Signals from the probe indicating the deflection of the probe stylus are combined with the readings from the X, Y and Z scales of the CMM to calculate the position of the stylus tip and thus the surface of the workpiece.

The computer contains a programme which causes the probe to scan the surface of the workpiece.

The probe will now be described in more detail with reference to FIG. 2. The probe 5 has a fixed structure 16 and a stylus supporting member 28 suspended relative to the fixed structure 16 by three serially connected pairs of leaf springs 18,20,22. The pairs of leaf springs permit translations of the stylus supporting member 28 relative to the fixed structure 16 in the X, Z and Y directions respectively, thus providing three translational degrees of freedom. The pairs of leaf springs 18,20,22 however act, to a first approximation, to prevent rotation of the stylus supporting member 28 relative to the fixed structure 16. The stylus supporting member 28 supports an elongate stylus 10 having a substantially spherical workpiece sensing tip 12 at its free end.

The stylus 10 is connected to a stylus changer module 50 which is in turn releasably mounted on the stylus mounting member 28 of the probe by magnetic means. The position of the stylus changer module 50 is defined by a co-operating kinematic elements 52,54 on the stylus changer module 50 and stylus mounting member 28 in known fashion.

The stylus supporting member 28 is connected to a member 14 which in turn is connected to the probe housing 16 via three pairs of leaf springs 18,20,22. The three pairs of leaf springs 18,20,22 are interconnected in series and are arranged to flex in the X, Y and Z dimensions respectively. The three pairs of leaf springs 18,20,22 are positioned in the YZ, XZ and XY planes respectively.

Each spring may be regarded as having a free and a fixed end, the fixed end being the end which, in the in-series connection, is nearest the housing 16. In this manner, springs 18 have free and fixed ends 18A,18B secured to the member 14 and an intermediate member 24 respectively. Springs 20 have free and fixed ends 20A,20B secured respectively to the intermediate member 24 and a second intermediate member 26. The springs 22 have free and fixed ends 22A and 22B secured respectively to the second intermediate member 26 and a part 16A of the housing 16.

A compact space-saving arrangement of the springs 18,20,22, is achieved by grouping the springs as if they are lying in the six sides of a rectangular box. More specifically, the arrangement is such that the springs 20 extend from their free ends 20A toward the free ends 18A of the springs 18 and lie adjacent the latter ends, and the springs 18,20 are situated in the space between the springs 22.

To make possible the connection between the springs 20,22 to the second intermediate member 26, the latter has a part 26A connecting the fixed ends of the springs 20 and a perpendicular part 26B connecting the free ends of the springs 22, the fixed ends of the latter spring being connected by the part 16A.

As shown, the member 14 to which the stylus is secured is innermost to the box formed by the springs 18,20,22. Hence the member 26A and the adjacent spring 22 have holes 30,32 for the stylus supporting member 28 to extend to the exterior of the said box.

Figure 2:
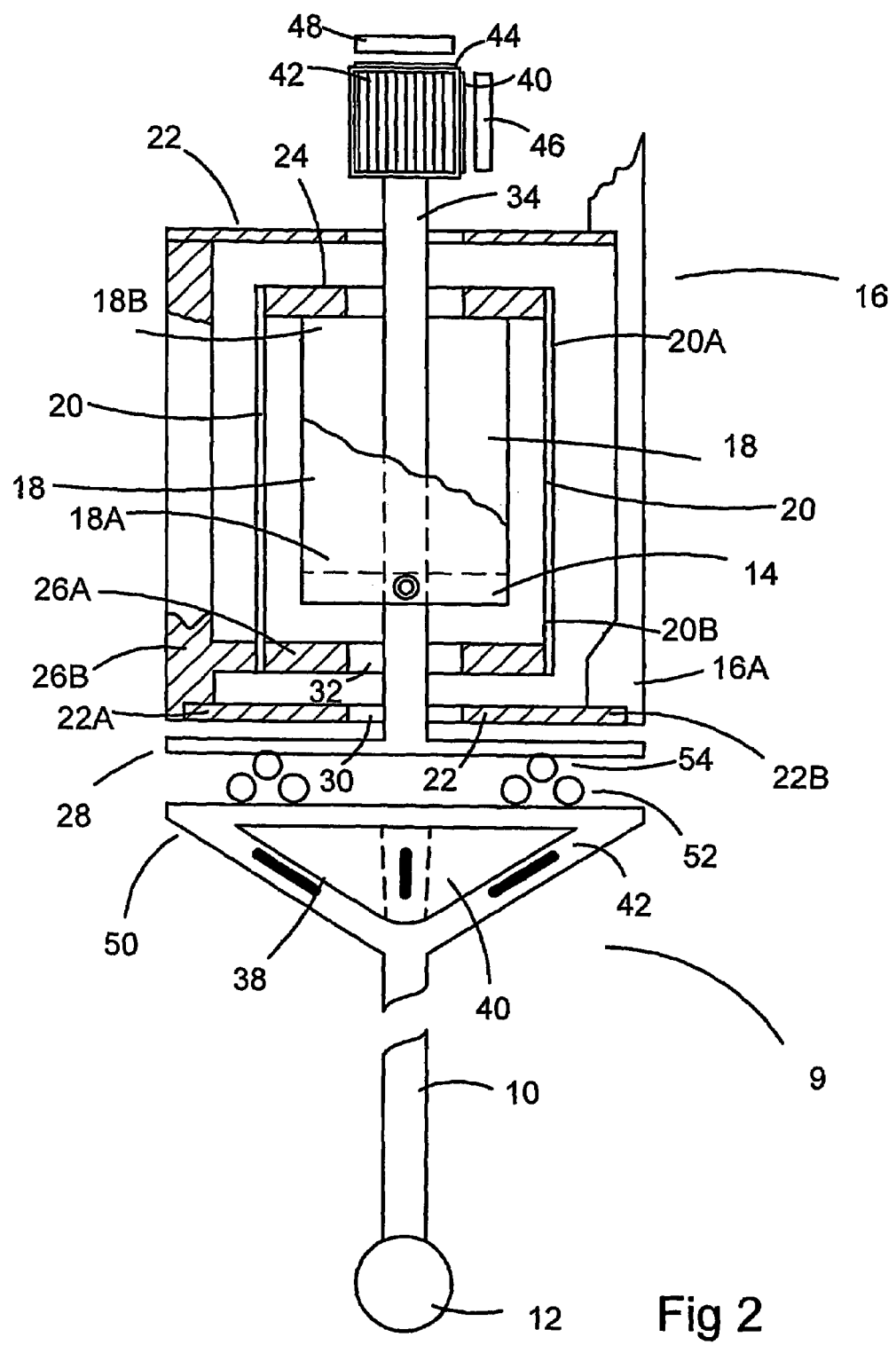
FIG. 2 is a cross section of the probe of a first embodiment of the invention.

As shown in FIG. 2, the stylus supporting member 28 is connected to an elongate stem 34 which extends through apertures in the leaf springs. The distal end of the stem 34 supports a cube 36 on which three scales 40,42,44 are mounted. Two of the scales 40,42 have lines extending in the Z direction and are mounted in XZ and YZ planes respectively and the third scale 44 has lines extending in the X direction and is mounted on the cube in an XZ plane. The cube 36 moves within cavity provided in the fixed structure, with movements which correspond exactly to the movements of the stylus supporting member 28 and to a first order approximation, the sensing tip of the stylus 12.

Readheads, of which only two 46,48 are shown are mounted on the fixed structure in register with the scales 40,42,44 and co-operate with the scales to measure displacement of the cube 36 within the cavity in the X,Y and Z directions. The readheads detect any displacement of the scales in a direction perpendicular to the spacing of the lines of each of the scales, but are insensitive to any movement of the scale either in a direction perpendicular to the plane of the scale, or along the direction of the lines of the scale.

Movement of the cube 36 relative to the fixed structure corresponds to a first order approximation to the movement of the workpiece sensing tip 12 relative to the fixed structure 16.

This conventional system of parallel springs combined with scale and readhead transducer system comprises a primary transducer system which enables the probe to achieve a large working range of greater than 1 mm. The probe is damped in a known manner, for example by using damping fluid between two moving parts or an electronically controlled solenoid.

In addition to this primary transducer system, a high frequency secondary transducer system is provided between the probe head and the stylus tip.

FIG. 2 shows a high frequency secondary transducer system comprising strain gauges 38 mounted on the wall of the stylus changer module 50. The wall of the stylus changer module is provided with three cut-out portions 40 such that three thin deformable bridges 42 remain. The strain gauges 38 are mounted on these deformable bridges 42.

Figure 3:
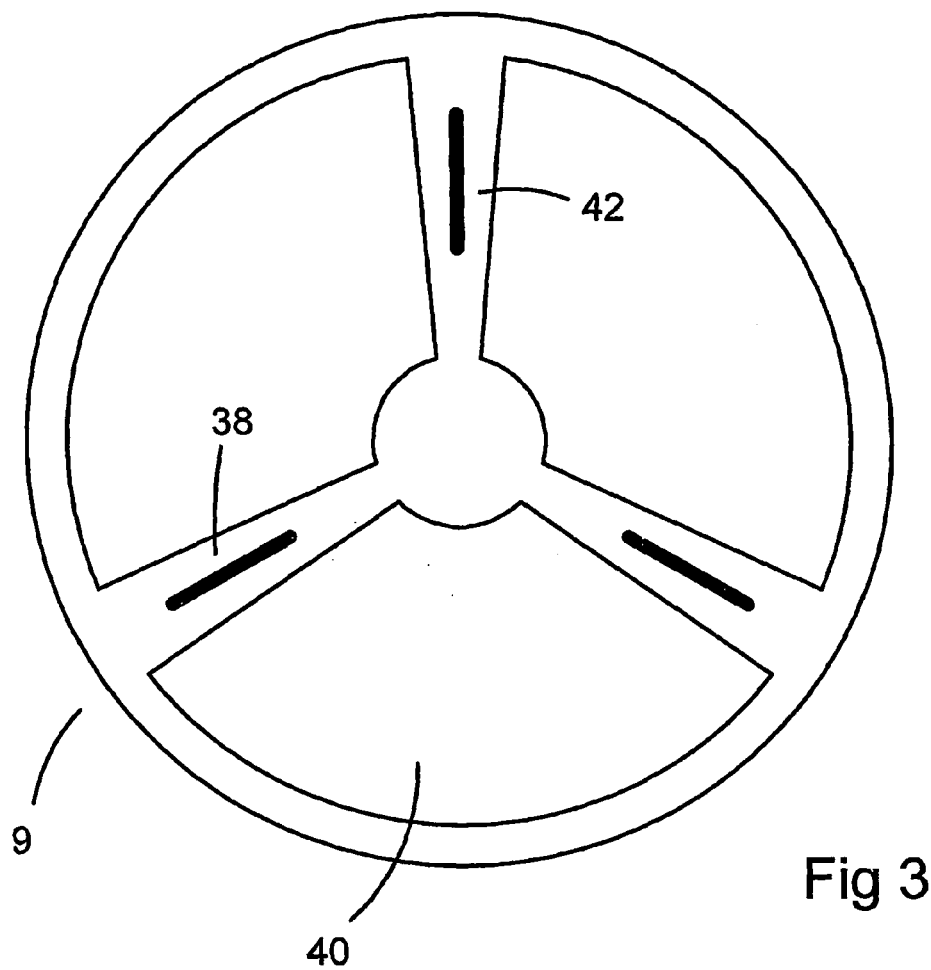
FIG. 3 is a cross-section of the stylus changer module shown in FIG. 2.

Preferably three strain gauges are mounted on the stylus changer module, spaced 120° apart, as shown in FIG. 3. This allows measurement of stylus bending in X, Y and Z. However two strain gauges may be mounted on the stylus changer mount to measure stylus bending in X and Y.

During scanning of the workpiece, bending of the stylus will occur due to the measurement force exerted by the probe. The strain gauges measure this deflection.

Figure 4:
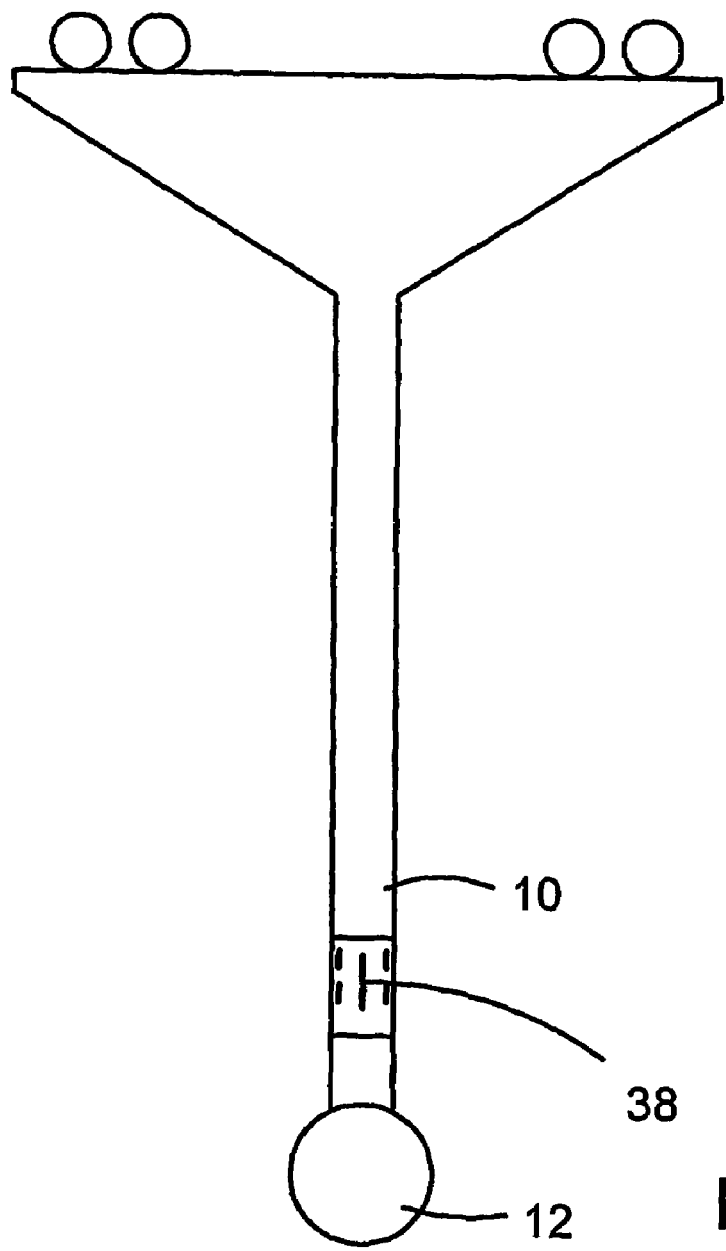
FIG. 4 is a side view of a stylus changer module for the probe according to a second embodiment of the invention.

A second embodiment of the secondary transducer system is illustrated in FIG. 4. In this figure the secondary transducers are located on the stylus 10. As before bending of the stylus produces a signal of the strain gauges. It is preferable to place this secondary transducer as close to the stylus tip as possible.

Figure 5:
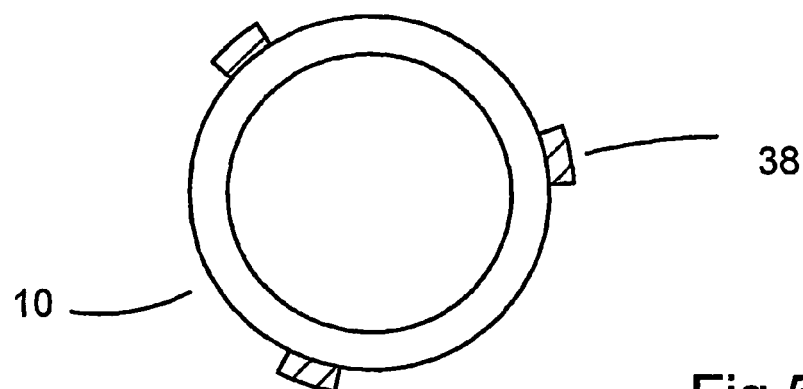
FIG. 5 is a cross-section of the stylus shown in FIG. 4.

As shown in FIGS. 4 and 5 the strain gauges are mounted on a deformable thin-walled tube 44 which is part of the stylus. Three strain gauges are spaced at 120° to enable measurement of the stylus bending in X, Y and Z. However if the stylus is stiff in the Z plane, it is sufficient to provide two strain gauges on the stylus to just measure bending in X and Y.

Figure 6:
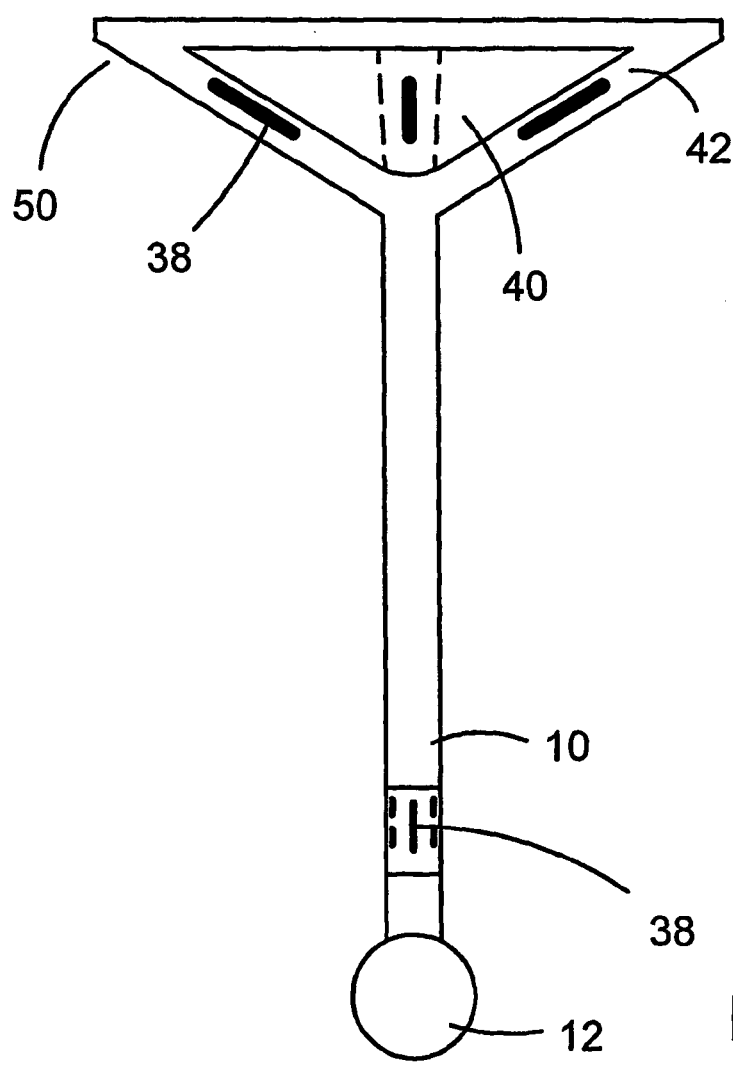
FIG. 6 is a side view of a stylus changer module for the probe according to a third embodiment of the invention.

In a third embodiment shown in FIG. 6, the secondary transducer system may be a combination of the first and second embodiments in which the secondary transducers are provided on both the stylus changer module and the stylus. In this case the readings from these two sets of transducers are combined.

The secondary transducer system may alternatively comprise transducers such as capacitance or optical sensors.

The total probe deflection is now the combined reading of the two sets of transducers (i.e. both the primary and secondary systems). The secondary transducer system (e.g. strain gauges 38) measures movement of the stylus tip 12 relative to the stylus supporting member 28. The primary transducer system (e.g. optical scales and readheads) measures movement of the stylus supporting member 28 relative to the spindle 6 of the CMM. Combination of the measurements from the primary and secondary transducers therefore provides a measurement of the movement of the stylus tip 12 relative to the CMM spindle 6.

Figure 7:
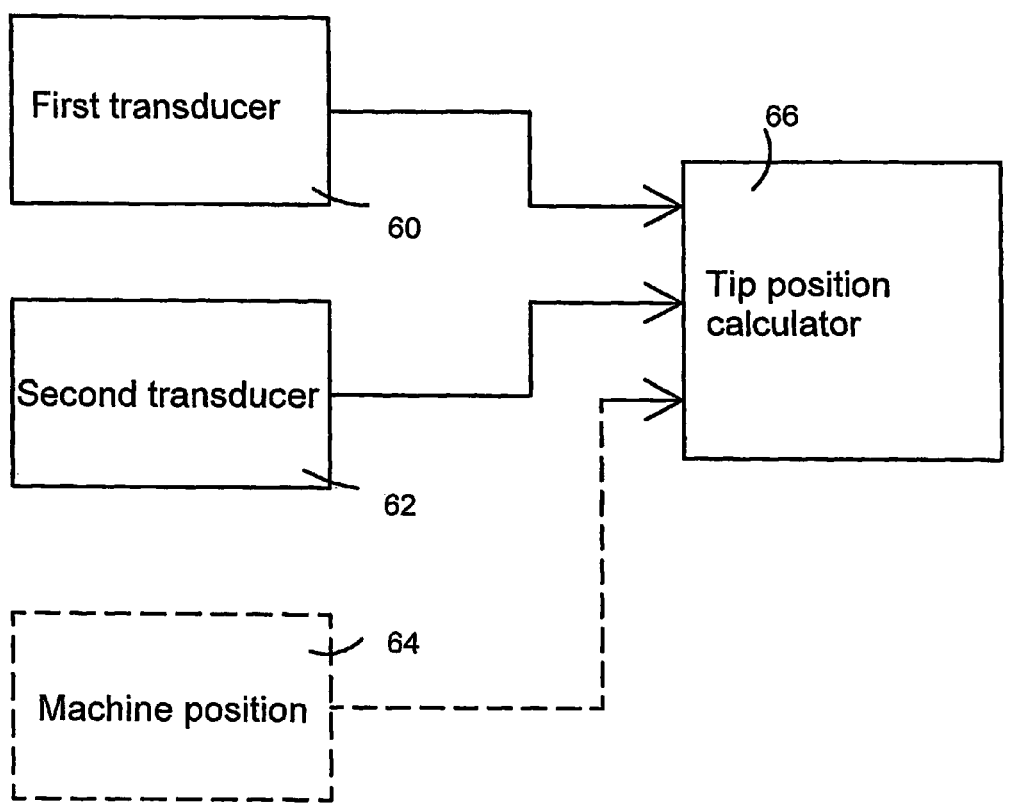
FIG. 7 is a schematic illustration of the signal processing means.

As illustrated in FIG. 7, the outputs from the first 60 and second 62 transducer systems are combined at a tip position calculator 66 to determine the position of the stylus tip. The outputs from the first and second transducer systems 60,62 may be combined in isolation to determine the stylus tip position relative to the probe housing. Alternatively, the outputs of the first and second transducer systems 60,62 may be combined with the machine position 64 to determine the stylus tip position relative to a machine datum.

The tip position calculator 66 may include a signal processor which enables the outputs from each transducer in each transducer system to be combined. (i.e. the outputs from three strain gauges in the second transducer system).

This combination has the advantage of the large working range of the primary transducer system and the high frequency of the secondary transducer system. Although the probe head described comprises a conventional system of parallel spring combined with scale and readhead transducers, any other system may be used. For example the transducer of the primary system may comprise an LVDT. Thus use of dual primary and secondary transducer systems is suitable for use in both passive and active probes.

The probe of the invention is not limited to having a three degrees of freedom translational motion system, such as for example the parallel spring mechanism described above. An alternative motion system could allow translational movement about a pivot for example as described in U.S. Pat. No. 6,430,833 in which a stylus holder is suspended from the probe housing by a pair of diaphragms. At least one of the diaphragms is formed with spiral cut-outs to enable the stylus to move transversely of the axis of the housing as the stylus holder pivots when transverse forces are applied to the stylus tip. Although there is a tilting motion, the output of the transducers are used to determine the linear displacement of the stylus tip.

This invention is not limited to a modular probe having a stylus changer module mountable on a stylus mounting member of the probe. Instead the probe may have an integral stylus. In this case the secondary transducer system will measure movement of the tip of the stylus relative to the first transducer system.

The probe of the present invention is calibrated in two stages. In a first stage the primary transducer system is calibrated using known methods with a non-transduced stylus fitted on the probe. This stylus is preferably short and rigid to minimise stylus bending during the calibration procedure.

In a second stage the non-transduced stylus is replaced with a stylus containing the secondary transducer system and the calibration process is repeated. The secondary transducer may thus be calibrated using the data from the calibrated primary transducer and CMM position data.

The invention claimed is:

1. A probe for use on a coordinate positioning apparatus comprising:
   a housing attachable to an arm of the coordinate positioning apparatus and a stylus mounted on a stylus support member, said stylus having a tip, and said stylus and stylus support member being deflectable with respect to the housing;
   a first transducer system which measures movement of the stylus support member relative to the arm of the coordinate positioning apparatus;
   a second transducer system which measures movement of the tip of the stylus relative to the stylus supporting member;
   a tip position calculator which combines outputs from the first and second transducer systems to provide a measurement of total stylus deflection.

2. A probe according to claim 1 wherein the first transducer system measures movement of the stylus support member relative to the arm of the coordinate positioning apparatus in at least three dimensions.

3. A probe according to claim 1 wherein the first transducer system measures transverse movement of the stylus support member relative to the arm of the coordinate positioning apparatus.

4. A probe according to claim 1 wherein the first transducer system has a range of less than 5 mm.

5. A probe according to claim 1 wherein the second transducer system measures movement of the tip of the stylus relative to the stylus supporting member in two dimensions.

6. A probe according to claim 1 wherein the second transducer system has a higher mechanical response than the first transducer system.

7. A probe according to claim 1 wherein the mechanical response of the second transducer system is at least five times higher than the mechanical response of the first transducer system.

8. A probe according to claim 1 wherein the second transducer system comprises at least one strain gauge.

9. A probe according to claim 8 wherein the at least one strain gauge comprises three strain gauges spaced at 120° about the longitudinal axis of the stylus.

10. A probe according to claim 1 wherein the secondary transducer system is mounted on the stylus support member.

11. A probe according to claim 10 wherein the stylus support member is provided with deformable bridges onto which the secondary transducer system is mounted.

12. A probe according to claim 1 wherein the secondary transducer system is mounted on the stylus.

13. A probe according to claim 12 wherein the second transducer system is located near the tip of the stylus.

14. A probe according to claim 12 wherein the stylus is provided with a deformable tube onto which the secondary transducer system is mounted.

15. A probe according to claim 1 wherein the secondary transducer system comprises at least one transducer mounted on the stylus support member and at least one transducer mounted on the stylus and wherein readings from the at least two transducers are combined to provide the data from the secondary transducer system.

16. A probe according to claim 1 wherein the secondary transducer system is one of an optical, capacitance or inductance transducer.

17. A probe for use on a coordinate positioning apparatus comprising:
   a housing attachable to an arm of the coordinate positioning apparatus and a stylus having a stylus tip, said stylus being deflectable with respect to the housing;
   a first transducer system which measures movement of the stylus relative to the arm of the coordinate positioning apparatus;
   a second transducer system which measures movement of the tip of the stylus relative to the first transducer system;
a tip position calculator which combines outputs from the first and second transducer systems to provide a measurement of total stylus deflection.

18. A method of measuring a surface of an object with a probe, said probe comprising a housing and a stylus mounted on a stylus support member, said stylus having a stylus tip, and said stylus and stylus support member being deflectable with respect to the housing, the method comprising the steps of:
   mounting the probe on an arm of a coordinate positioning apparatus;
   positioning the probe so that the stylus is in contact with the surface to be measured and moving the probe along said surface with the stylus remaining in contact with said surface;
   obtaining data from a first transducer system which measures movement of the stylus supporting member relative to the arm of the coordinate positioning apparatus;
   obtaining data from a second transducer system which measures movement of the tip of the stylus relative to the stylus supporting member;
   and combining the data from the first and second transducer systems to produce a measurement of total probe deflection.

* * * * *